INVENTOR
ROGER L. BARRON
BY: Jay M. Cantor

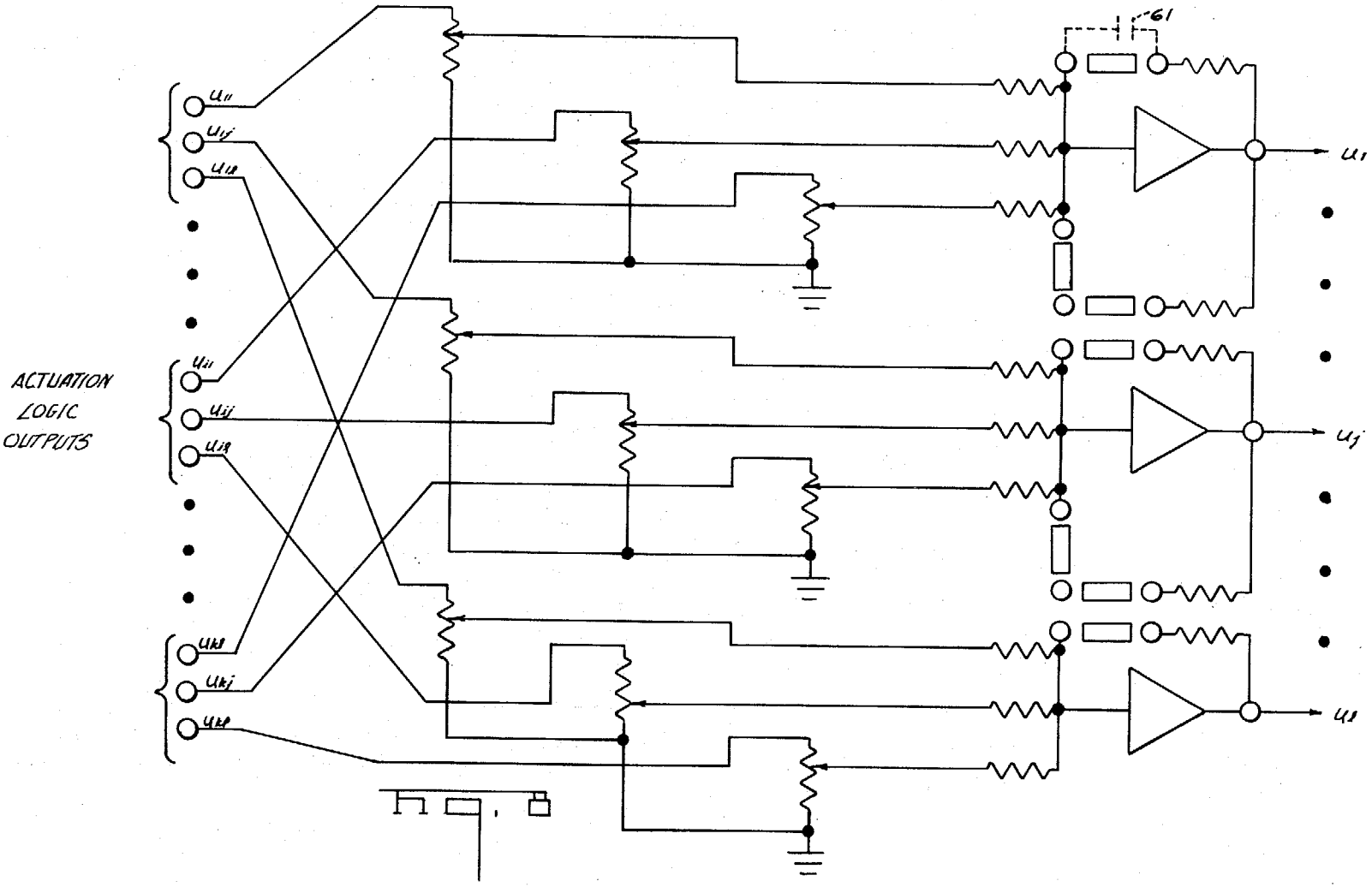
ACTUATION
LOGIC
OUTPUTS

United States Patent Office

Re. 27,561
Reissued Jan. 23, 1973

27,561

SELF-ORGANIZING CONTROL SYSTEM FOR PROVIDING MULTIPLE-GOAL, MULTIPLE-ACTUATOR CONTROL

Roger L. Barron, Burke, Va., assignor to Adaptronics, Inc., McLean, Va.

Original No. 3,519,998, dated July 7, 1970, Ser. No. 671,743, Sept. 29, 1967, which is a continuation-in-part of Ser. No. 565,162, July 14, 1966. Application for reissue Jan. 5, 1971, Ser. No. 104,184
Int. Cl. G05b *13/00*
U.S. Cl. 340—172.5 12 Claims

Matter enclosed in heavy brackets [ ] appears in the original patent but forms no part of this reissue specification; matter printed in italics indicates the additions made by reissue.

ABSTRACT OF THE DISCLOSURE

The disclosure relates to a self-organizing control system capable of accomplishing simultaneous, multiple-goal, multiple-actuator control of a plant in which the instantaneous influence of each actuator on multiple system error signals is identified and the self-organizing controller compensates for changing polarities of actuator effects, both direct and cross-coupled. The control is provided using pulse density coding techniques.

This application is a continuation-in-part of Ser. No. 565,162 of Roger L. Barron for Self-Organizing Control System, filed July 14, 1966 now Pat. No. 3,460,096 issued Aug. 5, 1969.

This invention relates to self-organizing control systems, and, more particularly, to a high speed self-organizing control system requiring a minimum of information storage and capable of accomplishing simultaneous, multiple-goal, multiple-actuator control of a plant wherein there is a cross-coupling between the controlled variables of the plant, such cross-coupling also being compensated for in accordance with the present self-organizing control system.

The present invention is an extension of the invention described in the application of Roger L. Barron, Ser. No. 565,162 entitled "Self-Organizing Control System" which was filed July 14, 1966, *now Patent No. 3,460,096,* and is incorporated herein in its entirety by reference. The self-organizing control system of the present invention also utilizes the techniques described in an application of Lewey O. Gilstrap, Jr., Ser. No. 660,640 entitled "Computer Using Pulse Density Code," filed Aug. 15, 1967, *now abandoned* which is incorporated herein in its entirety by reference.

Self-organizing control systems have been known to the prior art as described in the above noted application of Roger L. Barron, and such self-organizing control systems have found invaluable utility in the art and have provided controls heretofore unobtainable. While systems of this type are of great utility in the art, they are capable of single goal and single actuator control in a plant under control or of multiple-goal, multiple actuator control, provided that in the latter cases the controlled variables have inconsequential levels of interaction. In other words, they should be viewed as capable of on-line accomplishment of single goals by control of single actuators.

Many systems exist which have multiple goal requirements and have plural actuators, one for controlling each desired goal. Furthermore, many plants having multiple-goals and multiple-actuators also find an interdependence among goals. That is, the operation of one of the actuators for control of one of the goals will result in a significant change in the remaining plant variables thereby requiring that the system be capable of control despite the interdependence of the several goals and actuators therefor in the plant. Prior art control systems have not been capable of adequately coping with this problem, particularly when the interdependence is non-linear.

In accordance with the present invention, there is provided a self-organizing control system capable of providing on-line operation and providing a rapid, smooth response with minimum overshoot and small steady state errors. The self-organizing controller of the present invention provides simultaneous, multiple-goal, multiple-actuator control (frequently referred to as distributed-actuation control) in which the instantaneous influence of each actuator on multiple system error signals is identified and a self-organizing controller compensates for changing polarities of actuator direct and cross-coupled effects.

It is therefore an object of this invention to provide an improved self-organizing control system wherein predicted system performance of multiple variables is evaluated on-line, either continuously or periodically, to modify the course of action pursued by the self-organizing elements of a multiple goal plant or system.

It is another object of this invention to provide a self-organizing control system for providing simultaneous, multiple-goal, multiple-actuator control wherein the instantaneous influence of each actuator on multiple system error signals is identified, the controller compensating for changing polarities of actuator direct and cross-coupled effects.

It is a further object of this invention to provide a probability state variable (PSV) unit which operates utilizing pulse density coding techniques and operates in conjunction with a coupling unit to provide a system control signal for plant operation.

The above objects and still further objects of the invention will become apparent to those skilled in the art from a consideration of the folowing description of a preferred embodiment of the invention which is provided by way of example and not by way of limitation, wherein:

FIG. 3 is a block diagram of a typical performance assesment unit and associated actuation logic circuitry in accordance with the present invention;

FIG. 8 is a circuit diagram of the goal weighting logic circuits of the present invention.

Figure 1:
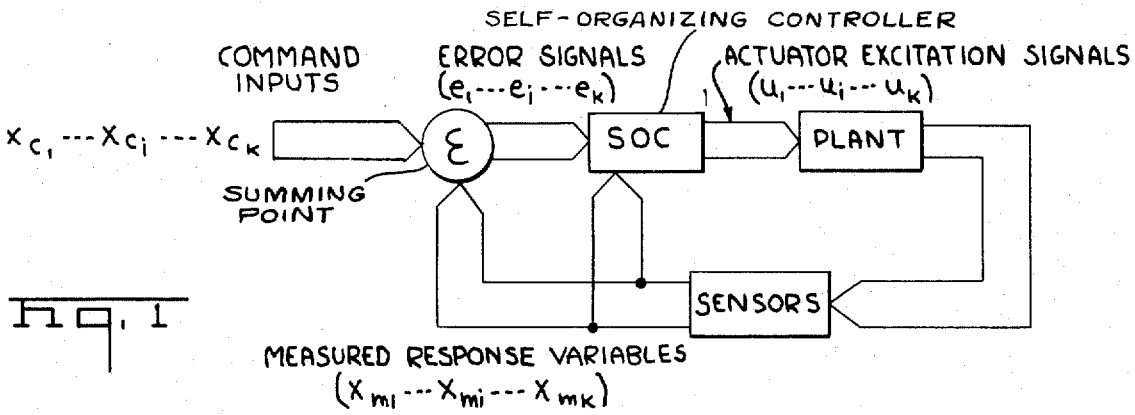
FIG. 1 is a schematic diagram of an entire system utilizing the self-organizing controller of the present invention.

Referring now to FIG. 1, there is shown a schematic diagram of a typical multiple-goal, multiple-actuator self-organizing control system wherein multiple command inputs $x_{c1} \ldots x_{ci} \ldots x_{ck}$ from an external source, such as the stick of an aircraft, are all simultaneously fed to a summing point $\Sigma$. These command inputs are summed at the summing point with measured response variables $x_{m1} \ldots x_{ml} \ldots x_{mk}$ which are provided by the sensors, there normally being one sensor for testing the response of each of the variables or goals at the plant. The sensors would normally be positioned in the plant though they need not be. The summing point provides a plurality of error signals $e_1 \ldots e_l \ldots e_k$ to a self-organizing control (SOC) system of the present invention wherein the error signals are operated upon in a manner described in detail hereinbelow to evaluate overall system performance and provide actuator excitation signals $u_1 \ldots u_l \ldots u_k$ based upon the evaluation of system performance. One such actuator excitation signal is provided for each actuator as well as cross-coupling signals for the remaining actuators, as will be disclosed in detail hereinbelow, to control the plant. It can be seen that the plant will continually be monitored as the plant variables are changed by comparing the sensed or measured response variables with the command input signals at the summing junction and continually providing changing error signals to the self-organizing controller indicative of system performance.

Figure 2:
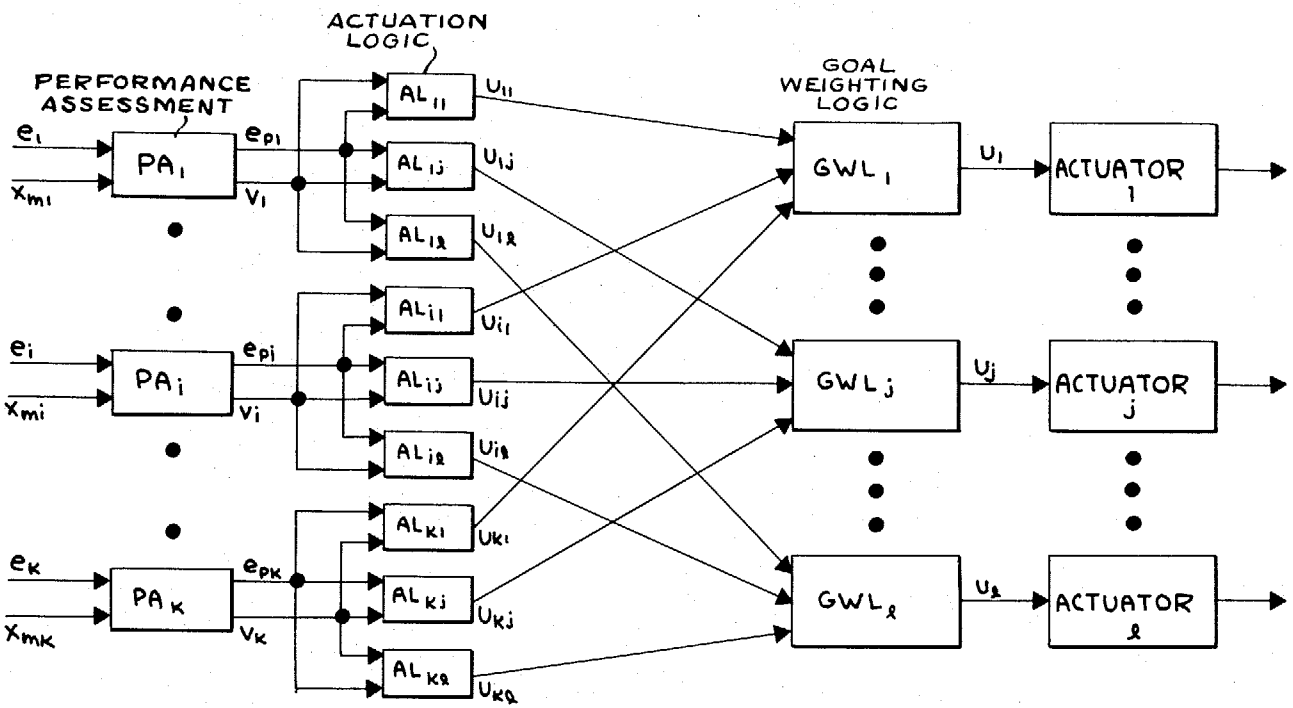
FIG. 2 is a block diagram of the multiple-goal, multiple-actuator self-organizing controller of the present invention.
Figure 2A:
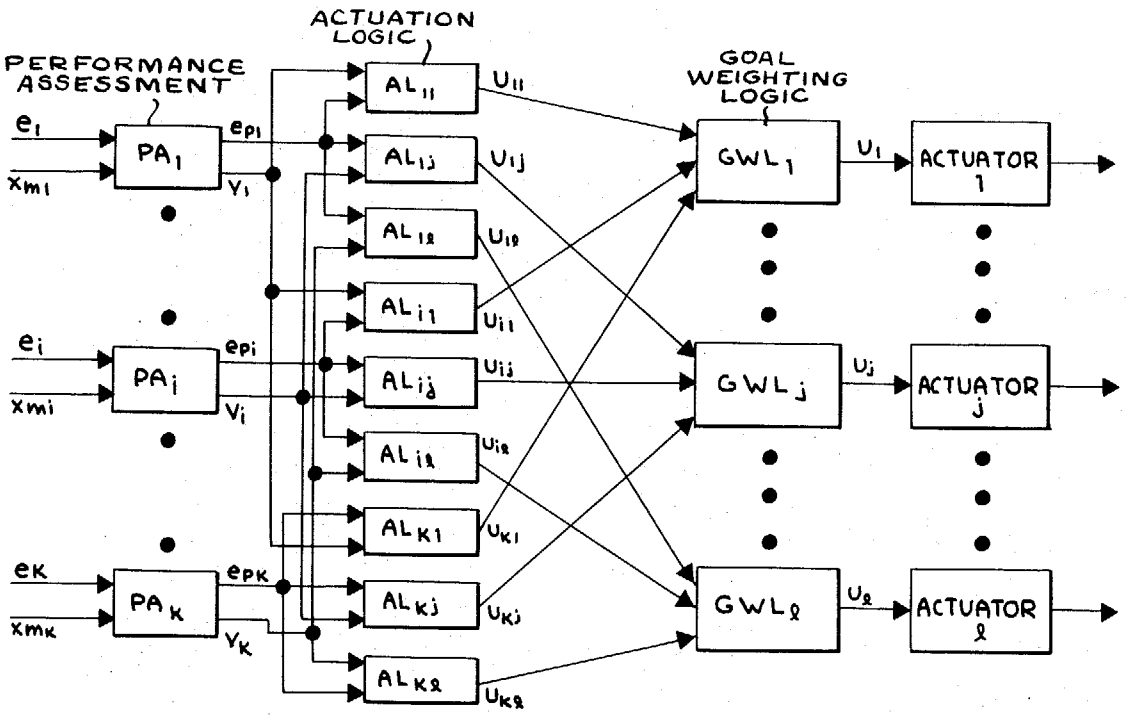
FIG. 2a is a alternative embodiment of a self-organizing controller wherein the plant responses are substantially decoupled.
Figure 7:
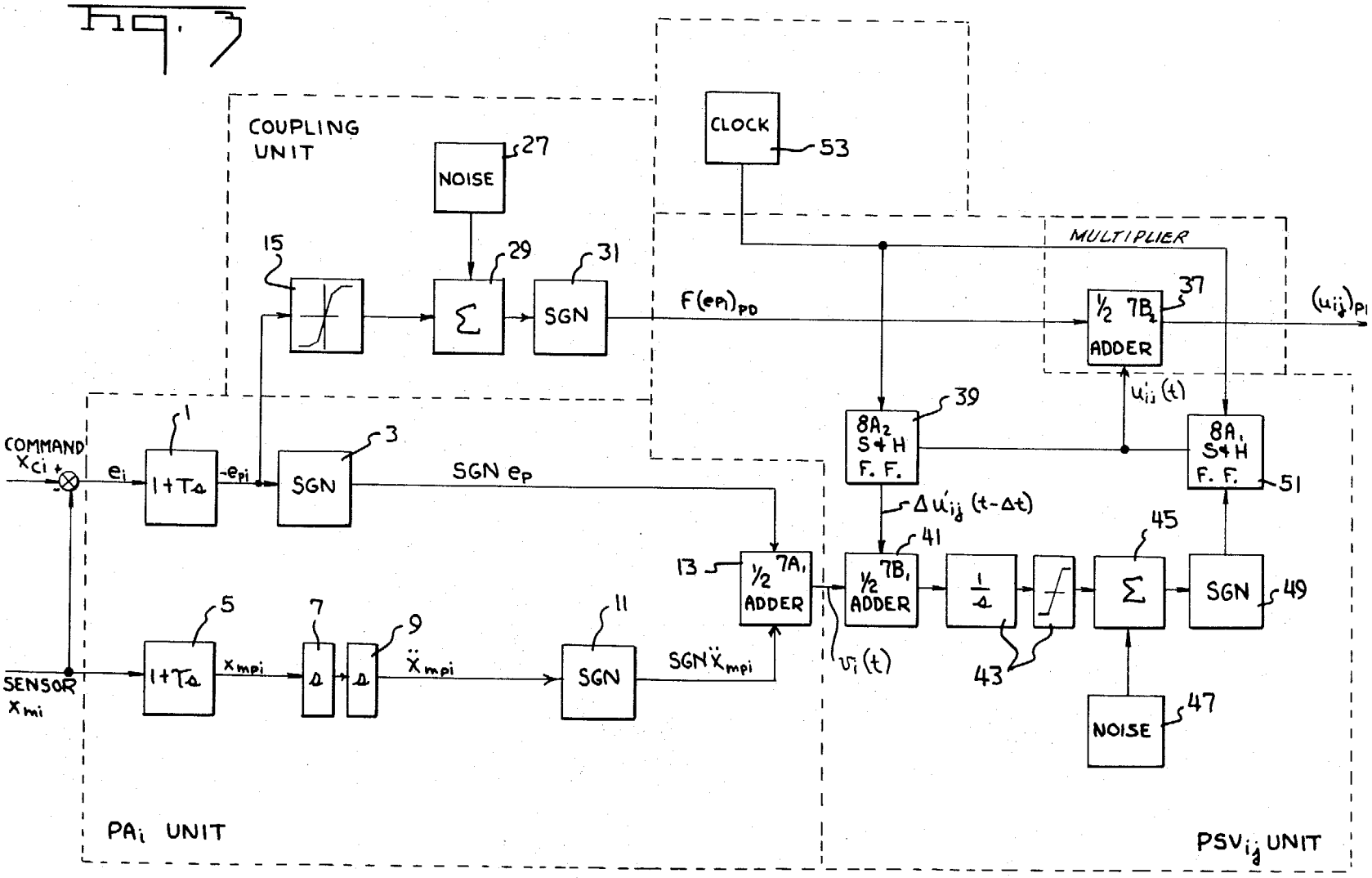

Referring now to FIG. 2, there is shown a block diagram of a typical self-organizing controller (SOC) for a multiple-goal, multiple-actuator system as used in accordance with the present invention. The controller includes a plurality of performance assessment units ($PA_1 \ldots Pa_l \ldots PA_k$), there being one performance assessment unit for each goal of the system. The performance assessment units each evaluate the performance relating to the variable with which each is associated. In other words, performance assessment unit [$Pa_l$] $PA_l$ will evaluate the performance of variable or goal number one which is ultimately controlled by the complete family of l actuators. The same is true for the remaining performance assessment units. The performance is assessed by evaluating the error signal $e_l$ and the signal received from the sensor $x_{ml}$ in a manner described in detail hereinbelow. A performance assessment unit similar to that of the present disclosure is fully disclosed in the above mentioned application of Roger L. Barron.

Associated with each performance assessment unit are a pair of input signals, these being labelled $e_1 \ldots e_l \ldots e_k$ (the error signals) and $Xm_1 \ldots$ [$xm_l$] $x_{ml} \ldots x_{mk}$ (measured response signals), corresponding subscripts of input signals being associated with the performance assessment unit of the same subscript. The $x_m$ input signals are derived directly from the sensors as shown in FIG. 1. The e (error) inputs are obtained by summing each input command signal $x_{c1} \ldots x_{cl} \ldots x_{ck}$ (FIG. 1) with the corresponding measured response variable $x_m$ having the same subscript to provide the required error (e) input for each performance assessment unit. Each performance assessment unit provides a pair of output signals, one output being a predicted error signal labelled by the appropriate member of $e_{p1} \ldots e_{pl} \ldots e_{pk}$ and the other output signal being the value signal labelled by the appropriate members $v_1 \ldots v_l \ldots v_k$.

The output from each performance assessment unit is fed to a plurality of actuation logic circuits $AL_{11} \ldots AL_{lj} \ldots AL_{kl}$. The general requirement is that there be actuation logic circuits associated with each performance assessment unit. In other words, there will generally be k x l actuation logic circuits where k is equal to the total number of performance assessment units and l is equal to the total number of actuators. As will be explained hereinbelow, each actuation logic circuit is composed of a coupling unit, a clock and a probability state variable (PSV) unit. The probability state variable unit is similar to the unit of like name in the above mentioned copending application of Roger L. Barron. The probability state variable unit functions as a signal correlator whose output signal magnitude and sign are based upon a continuous correlation between the polarity of the input value signal, $v_l(t)$, and the polarity of the previously-generated trial. $\Delta \acute{u}_{lj}(t-\Delta t)$, where $\Delta t$ is determined by the clock. This unit is thus capable of associating cause and effect basing each decision as to direction of proper biasing action on the result of its prior trial, thereby permitting realization of effective control even though characteristics of the controlled plant are incompletely known to the control system designer or user.

The output signals from each actuation logic circuit labelled $u_{11} \ldots u_{lj} \ldots u_{kl}$ respectively are fed to one of a plurality of goal weighting logic circuits $GWL_1 \ldots GWL_j \ldots GWL_l$, there being one goal weighting logic circuit associated with each actuator of the system. The particular associated goal weighting logic circuits are represented by the second subscrip of each of the u outputs from the actuation logic circuits. In other words, the $u_{11}$ output would be fed to the goal weighting logic $GWL_l$ circuit whereas the $u_{lj}$ would be fed to the jth goal weighting logic circuit, the $u_{kl}$ output would be sent to the lth goal weighting logic circuit, and so on. The goal weighting logic circuit is a summing circuit for summing all the input signals thereto and also provides a predetermined weighting to each of the input signals thereto in the event one or a plurality of the input signals is to be given more or less significance than the other input signals.

The output signals of the goal weighting logic circuits are labelled $u_1 \ldots u_j \ldots u_l$, respectively, and these signals operate the actuators of the plant to provide changing plant performance with the subsequent continual testing to obtain continually improved performance of the plant. It can be seen with reference to FIG. 2 that the self-organizing controller is capable of controlling systems having anywhere from one goal or variable and one actuator upward and is capable of adjusting for changes to one variable caused by the operation of all the system actuators or, mathematically speaking, operation on the off diagonal components of the plant response matrix. The theory of this operation is discussed in Analysis and Synthesis of Advanced Self-Organizing Control Systems of R. L. Barron, Interim Technical Report No. 1, August 1967. The underlying mathematical theory is beyond the scope of this disclosure and is fully set forth in Analysis and Synthesis of Advanced Self-Organizing Control Systems by Roger L. Barron et al., Technical Report AFAL-TR-67-93, April 1967 which is also hereby incorporated herein in its entirety by reference.

Referring now to FIG. 3, there is shown a block diagram of a typical performance assessment unit ($PA_l$) and an actuation logic circuit ($AL_{lj}$) as set forth in FIG. 2. The performance assessment unit $PA_l$ is provided with two input signals, one signal being obtained by the summation of the measured response variable $x_{ml}$ and the command input $x_{cl}$ to provide the input signal $e_l$. The other input signal to the performance assessment unit will be the measured response variable $x_{ml}$. The performance assessment unit provides a first output signal $e_{pl}$ which is the predicted error signal and is obtained by multiplying the $e_l$ input by $(1+\tau s)$ in the function block 1. The second output signal from the performance assessment unit $PA_l$ is the output signal $v_l$. The $v_l$ signal is obtained by noting the sign of the $e_{pl}$ signal in a signum (SGN) or sign detector 3 which provides a voltage of a first level for a positive $e_{pl}$ sign and a voltage of a second level for a negative $e_{pl}$ sign. The $x_{ml}$ input signal is multiplied in the $(1+\tau s)$ circuit unit 5 and differentiated twice in differentiators 7 and 9. The sign of the second derivative then at the output of differentiator 9 is obtained and applied to a sign detector 11, a positive sign providing a first voltage level output therefrom and a negative sign providing a second voltage level output. The signs of the $e_{pl}$ signal and the $\ddot{x}_{mpl}$ signal are then applied to a half adder 13. The half adder provides a reward $v_l$ output signal indicative of improved system performance when the signs of the $e_{pl}$ and the $\ddot{x}_{mpl}$ signals are different and in the other instance provides a punish signal indicative of regressive system performance. This is represented by the Boolean algebra equation $$v_i = \text{Reward}_i = SGNe_{pi} \cdot \overline{SGN\ddot{x}_{mpi} USGNe_{pi}} \cdot SGN\ddot{x}_{mpi}$$

The theory of this multiplication of the sign of predicted error ($e_{pi}$) by the sign of the acceleration of the measured response variable ($\ddot{x}_{mpi}$) is fully set forth in the above noted technical reports.

Figure 4:
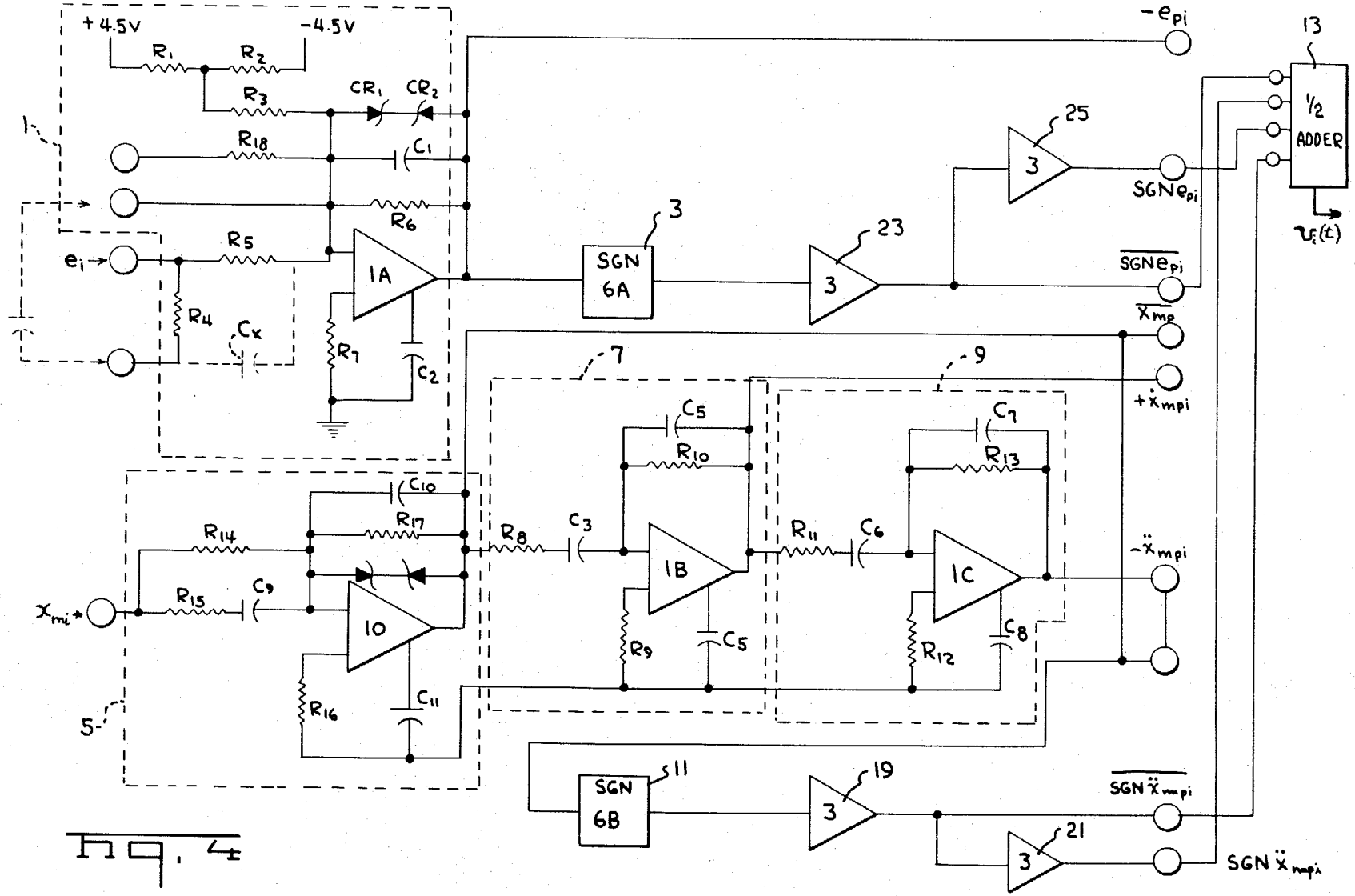
FIG. 4 is a circuit diagram of one of the performance assessment units $PA_1$ of the present invention.

The circuitry for performing the functions of the several blocks of the PA unit of FIG. 3 is known in the art. Typical circuits are set forth in FIG. 4 wherein circuits within dotted lines correspond to blocks in FIG. 3 having identical character references. The inverters marked 19, 21, 23 and 25 are not logically significant and provide amplification in addition to inversion of the signal. It should be noted that capacitor $C_x$ can be varied to adjust the time constant T.

The coupling unit receives an input signal $e_{pi}$ from the performance assessment unit $PA_i$, this input being fed to a non-linear function generator 15. The output of the function generator 15 is fed to a distributed spectrum modulator 17 which is composed of a random noise source 27 having zero mean which feeds a summing circuit 29, the summing circuit also being fed by the function generator 15. The output of the function generator acts as a biasing circuit about which the noise signals are randomly distributed. In this manner, the level of the signal from the function generator will determine, according to the Gaussian error function, the percentage of signals from the summing circuit 29 which are above and below the mean of the noise. The output of the summing circuit is fed to a sign detector 31 which provides an output signal indicative of the sign at the output of the summing circuit.

A typical distributed spectrum modulator is described in the above noted application of Lewey O. Gilstrap, Jr., under the name of "Statistical Source." The output of the sign detector 31 is labelled F $(e_{pi})_{PD}$ since it is in pulse density code as fully described in the above noted application of Lewey O. Gilstrap, Jr.

Figure 5:
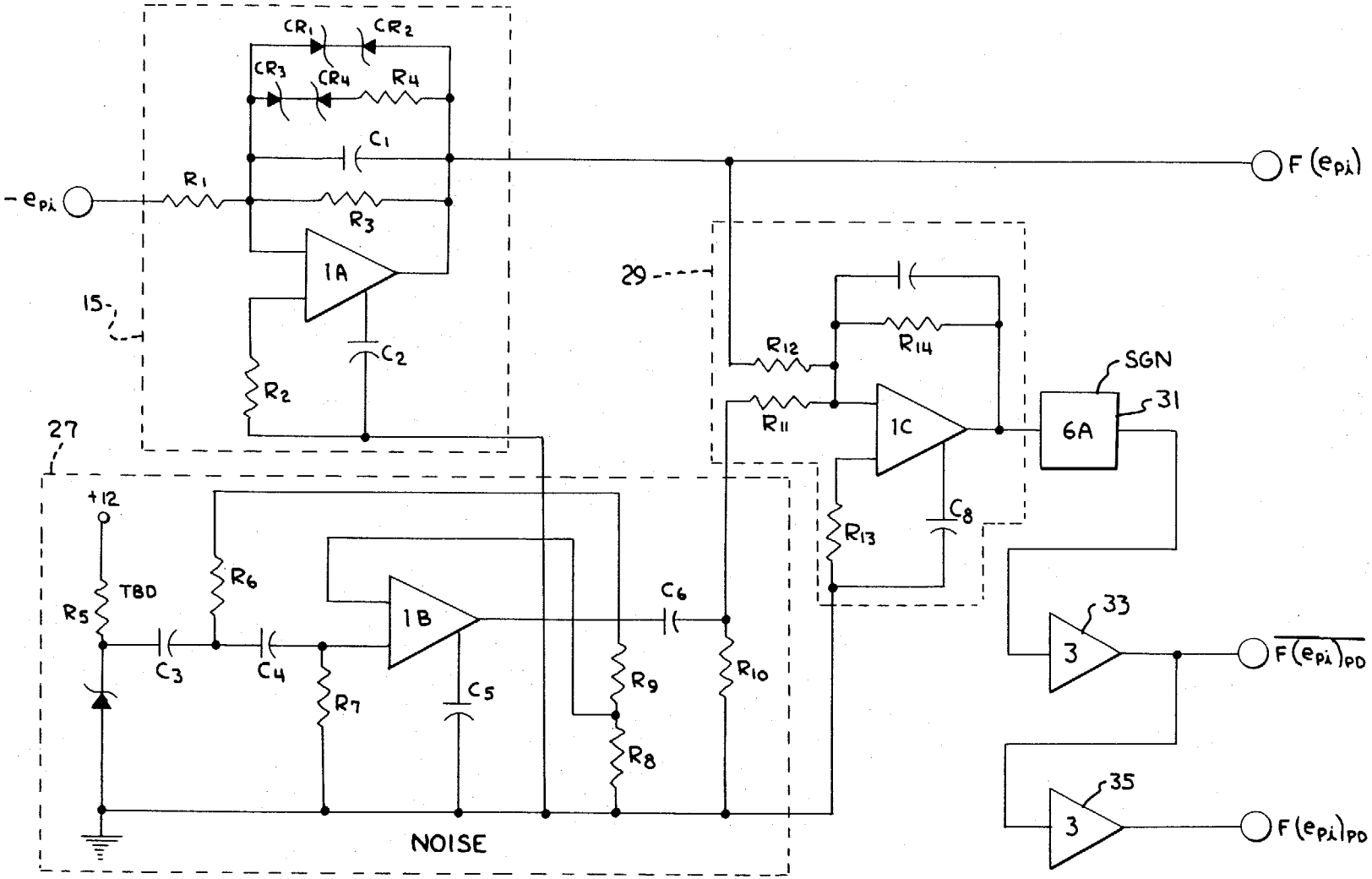
FIG. 5 is a circuit diagram of one of the coupling units $CU_1$ of the present invention.

The circuitry for performing the functions of the several blocks of the coupling unit of FIG. 3 is known in the art. Typical circuits are set forth in FIG. 5, wherein circuits within dotted lines correspond to the blocks in FIG. 3 having identical character references. The inverters marked 33 and 35 are not logically significant and provide amplification in addition to inversion of the signal.

The output of the distributed spectrum modulator 17 is fed to a multiplier circuit 37 (half adder) along with the output $\bar{u}_{ij}(t)$ from the probability state variable unit ($PSV_{ij}$) to provide an output signal $(u_{ij})_{PD}$ in pulse density code as explained hereinbelow.

The output of the $PSV_{ij}$ unit is provided by multiplying the output $v_i$ of the performance assessment unit with the output of a sample and hold flip flop 39 in a multiplier 41 (half adder). The output of the multiplier or half adder 41 is integrated and limited by integrator and limiter 43 to provide a bias level at a summing junction 45, the summing junction also being provided with noise from a noise source 47. The bias level provided by the integrator and limiter will determine statistically the number of output signals from the summing junction 45 which are of positive and negative signs in the same manner as in the distributed spectrum modulator 17 described hereinabove. The sign detector 49 provides an output signal indicative of the sign of the output of the summing junction 45 and sets a sample and hold flip flop 51 to provide an indication of the output of the sign detector 49. The output of the sample and hold flip flop 51 provides the second input for the multiplier [35] *37* which, in conjunction with the output of the distributed spectrum modulator 17 of the coupling unit, provides the output signal $u_{ij})_{PD}$. An output from each of the sample and hold flip flops 39 and 51 is provided periodically by the operation of a clock 53. The output of the sample and hold flip flop 51 is supplied to the input of sample and hold flip flop 39 by the operation of the clock as well as to the multiplier 37, the output of the sample and hold flip flop 39 being fed to the multiplier or half adder 41 upon operation of the clock 53 to provide an output signal therefrom indicative of the sign of the $\Delta\bar{u}_{ij}(t)$ signal provided one sampling earlier.

At any instant of time, the output of sign detector 49 is available at the input of flip flop 51. Upon receipt at flip flop 51 of a pulse at time t from clock 53, the output of sign detector 49, then available, is stored in flip flop 51 and is made available at the output thereof. This output is also then available at the input of flip flop 39. The next clock pulse occurs at time $t+\Delta t$ and transfers the information then available at the input of flip flop 39 to the output thereof and stores this information therein. In this manner, flip flops 39 and 51 act as a shift register to produce a $\Delta t$ time delay from the output of flip flop 51 to the output of flip flop 39. Flip flop 51 also acts as a digital filter.

Figure 6:
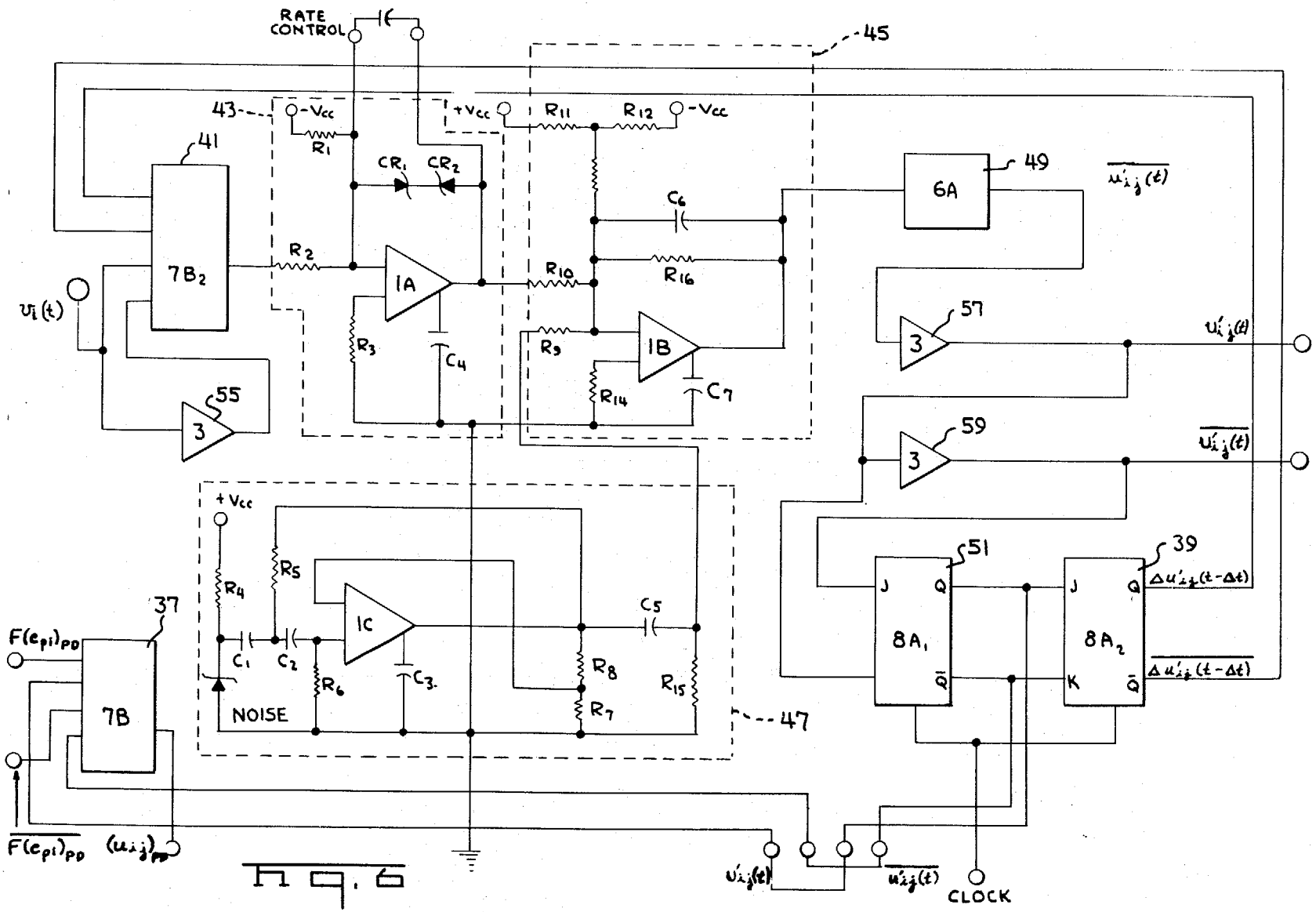
FIG. 6 is a circuit diagram of one of the probability state variable units and a further multiplier of the actuation logic circuit of the present invention.

The circuitry for performing the functions of the several blocks of the probability state variable circuit of FIG. 3 is known in the art. Typical circuits are set forth in FIG. 6 wherein circuits within dotted lines correspond to blocks in FIG. 3 having identical character references. The inverters marked 55, 57 and 59 provide amplification and inversion of the signal.

The output signal $(u_{ij})_{PD}$ from the probability state variable circuit $PSV_{ij}$ will then then be applied to the goal weighting logic circuit $GWL_j$ associated therewith to provide control as described hereinbelow.

Figure 7:
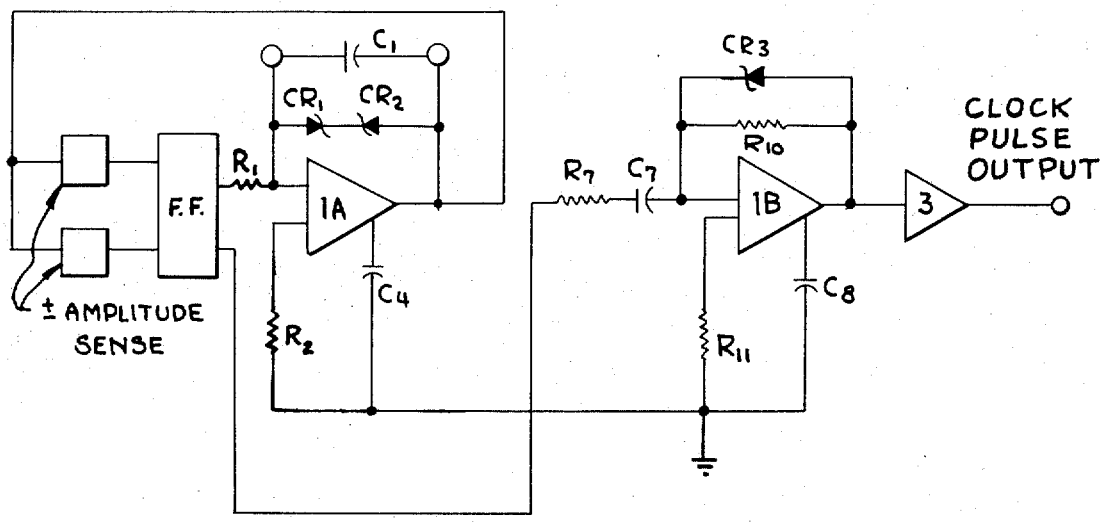
FIG. 7 is a circuit diagram of a clock of the present invention.

The circuit of the clock 53 is shown in detail in FIG. 7 and provides pulses at intervals $\Delta t$.

A typical goal weighting logic circuit system is shown in FIG. 8. Each goal weighting logic circuit is provided with inputs from the associated probability state variable circuits, each input having a potentiometer therein to weight each input in predetermined manner. The inputs, after weighting, are summed at a summing point. A capacitor 61 may be added to each goal weighting logic circuit to provide smoothing of the pulse density modulated signals.

The goal weighting logic circuits provide actuator excitation signals $u_1 \ldots u_j \ldots u_l$ in response to the summation of signals applied thereto to provide actuator operation and thereby alter plant operation.

It should be understood that the half adders are actually multipliers, since they provide an output indication based upon the most significant term of each input thereto, namely the sign of each. Accordingly, the half adders will provide a positive output signal for two positive input signals or two negative input signals and will provide a negative output signal for input signals of opposite sign.

Though the invention has been described with respect to a specific preferred embodiment thereof, it should be understood that many variations and modifications thereof will immediately become apparent to those skilled in the art. It is therefore the intention that the appended claims be interpreted as broadly as possible in view of the prior art to include all such variations and modifications.

What is claimed is:

1. A self-organizing control system for controlling a multiple-goal, multiple-actuator plant which comprises (1) a controlled plant, (2) means associated with said controlled plant for measuring plural response variables thereof, (3) means responsive to a command signal associated with each of said variables and a measured response variables signal associated with each of said variables to provide a plurality of error signals, one error signal for each variable, (4) *actuation logic* means responsive to said error signols for providing plural groups of [actuator excitation] *actuation logic output* signals, and (5) actuator means for controlling said plant, said actuator means being responsive to [excitation] *actuation logic output* signals from a plurality of said plural groups of [actuator excitation] *actuation logic output* signals.

2. A self-organizing control system as set forth in laim 1, wherein said means responsive to said error sig-ıals includes a plurality of performance assessment units esponsive to said error signals and a plurality of actuation ogic units responsive to each said performance assessment ınit to provide *said actuation logic output signals, said ıctuation logic output signals being* components of said ılural groups of actuator excitation signals.

3. A self-organizing control system as set forth in claim !, wherein each of said actuation *logic* units provides an [actuator excitation] *actuation logic output* signal, and ach group of actuation logic output[s] *signals* is pro-ided by the actuation logic units associated with one of aid performance assessment units, each group of actuator ogic outputs providing at least a partial control for a ılurality of said actuator means.

4. A self-organizing control system as set forth in claim l, further including means coupling actuation [excitation] *ıutput* signals [components] from plural of said groups ıf actuation logic output[s] *signals* to one of said actuator neans.

5. A self-organizing control system as set forth in claim !, further including means coupling actuation [excitation] *ıutput* signals [components] from plural of said groups ıf actuation logic output[s] *signals* to one of said actuator neans.

6. A self-organizing control system as set forth in claim ', further including means coupling actuation [excitation] *ıutput* signals [components] from plural of said groups ıf actuation logic output[s] *signals* to one of said actuator neans.

7. A self-organizing control set as set forth in claim 4, vherein said coupling means includes means associated vith [actuator excitation signal components] *said actua-ion logic output signals* for controlling the level thereof.

8. A self-organizing control system as set forth in claim ', wherein said coupling means includes means associated vith [actuator excitation signal] *said actuation logic out-ıut signals* for controlling the intensity level thereof.

9. A self-organizing control system as set forth in claim !, wherein each said actuation logic unit includes a prob-ıbility state variable unit, further including means in each ıaid performance assessment unit for providing a pre-licted error signal, means coupled to each said perform-ınce assessment unit and responsive to said predicted er-'or signal for providing a signal which is a function of ıaid predicted error signal, means for providing a value ıignal indicative of the logical coincidence of the signs of ıaid predicted error signal and the predicted acceleration ıf said measured response variable, means for providing a biasing signal increment indicate of the logical coincidence of the signs of said value signal and the prior output of said probability state variable unit, and means responsive to a function of said biasing signal increment and said signal which is a function of said predicted error signal for providing said [actuator excitation signal component] *actuation logic output signals.*

10. A self-organizing control system as set forth in claim 5, wherein each said actuation logic unit includes a probability state variable unit further including means in each said performance assessment unit for providing a predicted error signal means coupled to each said performance assessment unit and responsive to said predicted error signal for providing a signal which is a function of said predicted error signal, means for providing a value signal indicative of the logical coincidence of the signs of said predicted error signal and the predicted acceleration of said measured response variable, means for providing a biasing signal increment indicative of the logical coincidence of the signs of said value signal and the prior output of said probability state variable unit, and means responsive to a function of said biasing signal increment and said signal which is a function of said predicted error signal for providing said [actuator excitation signal component] *actuation logic output signals.*

*11. In a control system for controlling a plant in response to plant control signals, said system including command input signals, measured response signals indicative of plant response and error signals indicative of the discrepancy between said command input signals and said measured responsive signals, means to control said plant responsive to said error signals, said means comprising first means to provide a first signal which is a first predetermined function of said error signal, second means responsive to said error signal to provide a second signal which is a second predetermined function of said error signal and means for multiplying said first and second signals to provide said plant control signals.*

*12. A control system as set forth in claim 11 wherein said first means includes means for providing a derivative of said error signals.*

References Cited

The following references, cited by the Examiner, are of record in the patented file of this patent or the original patent.

UNITED STATES PATENTS

| | | | |
|---|---|---|---|
| 3,428,791 | 2/1969 | Chandos | 235—151.1 |
| 3,555,252 | 1/1971 | Garden | 235—151.1 |

RAULFE B. ZACHE, Primary Examiner

U.S. Cl. X.R.

235—151.1